US008162302B2

(12) United States Patent
Turner et al.

(10) Patent No.: US 8,162,302 B2
(45) Date of Patent: Apr. 24, 2012

(54) AUTOMATED DOLLY ASSEMBLIES

(75) Inventors: Timothy R. Turner, Georgetown, KY (US); Daniel K. Claunch, Harrodsburg, KY (US); Travis S. Cotten, Shelbyville, KY (US); Bradley Jay Sallee, Harrodsburg, KY (US); Cory D. Bronger, Georgetown, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 448 days.

(21) Appl. No.: 12/471,886

(22) Filed: May 26, 2009

(65) Prior Publication Data

US 2010/0301538 A1 Dec. 2, 2010

(51) Int. Cl.
*B23Q 1/00* (2006.01)

(52) U.S. Cl. ................ 269/53; 269/56; 269/17; 269/16; 269/22

(58) Field of Classification Search .................... 269/17, 269/53, 22, 56, 16
See application file for complete search history.

(56) References Cited

U.S. PATENT DOCUMENTS 4,342,535 A * 8/1982 Bartlett et al. ............. 414/744.4
4,589,184 A * 5/1986 Asano et al. .................... 29/430
4,589,199 A * 5/1986 Ohtaki et al. ................... 29/714
4,636,136 A * 1/1987 Nomura et al. ............... 414/730
4,776,085 A 10/1988 Shiiba
4,871,154 A * 10/1989 Seney ............................. 269/97
4,876,782 A * 10/1989 Carpinella et al. .............. 29/234
5,203,073 A 4/1993 Kotake et al.
5,319,840 A 6/1994 Yamamoto et al.
5,351,384 A 10/1994 Barnhart et al.
6,202,296 B1 3/2001 Tatsuda et al.
6,226,848 B1 * 5/2001 Kurtz ......................... 29/407.01
2007/0079503 A1 4/2007 Lee
2007/0226980 A1 10/2007 Lachowski et al.

* cited by examiner

*Primary Examiner* — Lee D Wilson
*Assistant Examiner* — Melanie Alexander
(74) *Attorney, Agent, or Firm* — Dinsmore & Shohl LLP

(57) ABSTRACT

Disclosed is an automated dolly assembly that includes a body including a frame and a top surface, a sync arm and a support arm connected to the body, and at least one switch disposed on the body to control movement of the support arm. The sync arm is capable of movement between a first position and a second position, and when the sync arm is in the first position, the sync arm is free from contact with a portion of a workpart carrier traveling along a rail of an overhead conveyor. When the sync arm is in the second position, the sync arm contacts a portion of the workpart carrier. The support arm is also capable of movement between a first position and a second position, and when the support arm is in the first position, the support arm is free from contact with a portion of the workpart carrier. When the support arm is in the second position, the support arm contacts a portion of the workpart carrier.

19 Claims, 3 Drawing Sheets

AUTOMATED DOLLY ASSEMBLIES

TECHNICAL FIELD

The invention relates to devices utilized in assisting an assembly line worker, and more specifically, to automated dolly assemblies utilized in stabilizing a workpart carrier traveling along a rail of an overhead conveyor system.

BACKGROUND

In vehicle assembly line manufacturing processes, workparts are often attached to workpart carriers that travel along a rail of an overhead conveyor system. Many times, the carriers are not rigidly supported on the rail of the overhead conveyor system. As a result, the carriers, as well as the workparts attached to the carriers, may be capable of a range of movement. This movement makes it difficult for workers to perform a manufacturing operation on the workpart, thus decreasing efficiency. Accordingly, devices and methods are continually sought to improve efficiency in performing manufacturing operations in assembly line manufacturing processes.

SUMMARY

One embodiment of an automated dolly assembly includes a body including a frame and a top surface, a sync arm connected to the body, a support arm connected to the body and a first switch disposed on the body to control movement of the support arm.

Another embodiment of an automated dolly assembly includes a body including a frame and a top surface, a sync arm connected to the body, a support arm connected to the body, and at least one switch disposed on the body to control movement of the support arm, wherein when a workpart carrier traveling along a rail of an overhead conveyor system reaches a predetermined position in relation to the automated dolly assembly, an automated sync system controls movement of the sync arm from a first position to a second position. When the at least one switch is activated, the support arm moves from a first position to a second position.

Another embodiment of an automated dolly includes a body including a frame and a top surface, a sync arm connected to the body, a support arm connected to the body and at least one switch disposed on the body to control movement of the support arm. The sync arm is capable of movement between a first position and a second position, wherein when the sync arm is in the first position, the sync arm is free from contact with a portion of a workpart carrier traveling along a rail of an overhead conveyor, and when the sync arm is in the second position, the sync arm contacts a portion of the workpart carrier. The support arm is also capable of movement between a first position and a second position, wherein when the support arm is in the first position, the support arm is free from contact with a portion of the workpart carrier, and when the support arm is in the second position, the support arm contacts a portion of the workpart carrier.

These and additional features can be more fully understood in view of the following detailed description, in conjunction with the drawings.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
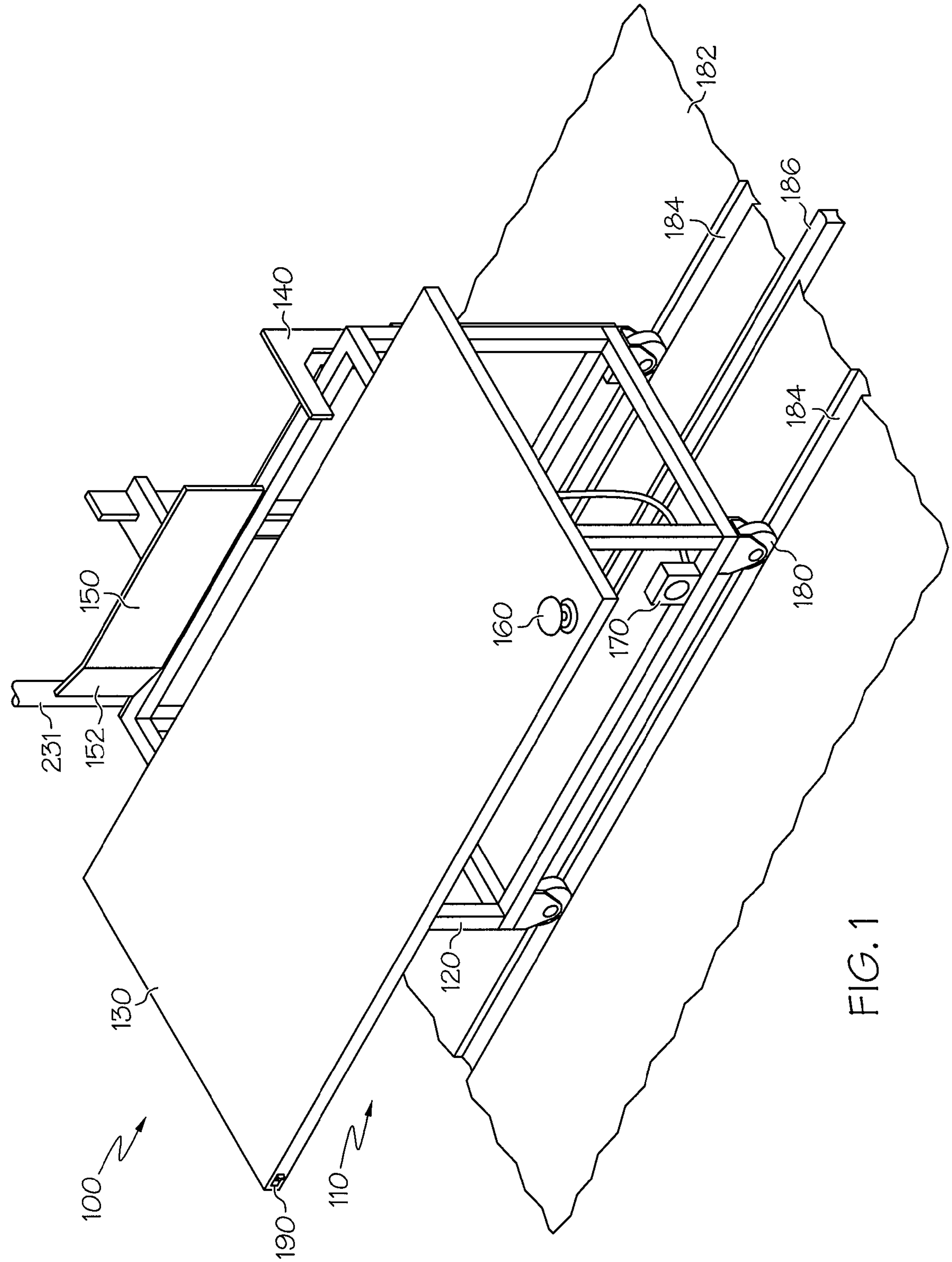
FIG. 1 is a perspective view of an exemplary automated dolly assembly according to one embodiment of the present invention.

As will be discussed in relation to the figures, embodiments of automated dolly assemblies 100 may include a body 110 (comprising a frame 120 and a top surface 130), a sync arm 140, a support arm 150 and a first switch 160. It should be understood, however, that other embodiments of automated dolly 100 may include additional structure, such as, for example, a second switch 170, a plurality of wheels 180, an emergency release switch 190 and a firing mechanism 230.

Referring to FIG. 1, body 110 of automated dolly assembly 100 may consist of frame 120 and top surface 130. FIG. 1 illustrates an embodiment of automated dolly assembly 100 that includes frame 120 constructed of squared steel tubing and top surface 130 constructed of plywood. However, frame 120 and top surface 130 need not be constructed from such materials. Embodiments of automated dolly assembly 100 may include frame 120 and top surface 130 constructed from any suitable materials known in the art, including, but not limited to, steel, iron, aluminum, wood, plastic, polymers and the like.

Additionally, frame 120 and top surface 130 may be assembled in any suitable shape and/or size dimensions for a particular application. The exemplary illustrated embodiment has rectangular prism-shaped frame 120 and a rectangular-shaped top surface 130 with dimensions suitable for cooperation with a workpart carrier 210 traveling along a rail of an overhead conveyor system (not shown). Embodiments useful in other applications may require alternate shapes and/or size dimensions. Moreover, frame 120 may consist of an open framework as shown, or may further include panels enclosing the front and sides of the frame. In other non-illustrated embodiments of automated dolly assembly 100, frame 120 and top surface 130 may also include further structure, such as, for example, bins and trays for storing clips and other workpart accessories, tool holsters, and the like. However, embodiments of automated dolly assembly 100 need not include such additional structure.

Still referring to FIG. 1, sync arm 140 may be any structure utilized to sync the movement of automated dolly assembly 100 with the movement of a workpart carrier traveling along a rail of an overhead conveyor system. The illustrated embodiment includes sync arm 140 that is an "L" shaped piece of steel. However, the particular shape of sync arm 140 is not critical, as sync arm 140 may be constructed in any suitable shape and/or size dimensions for a particular application, and may be constructed of any suitable materials known in the art.

Figure 2:
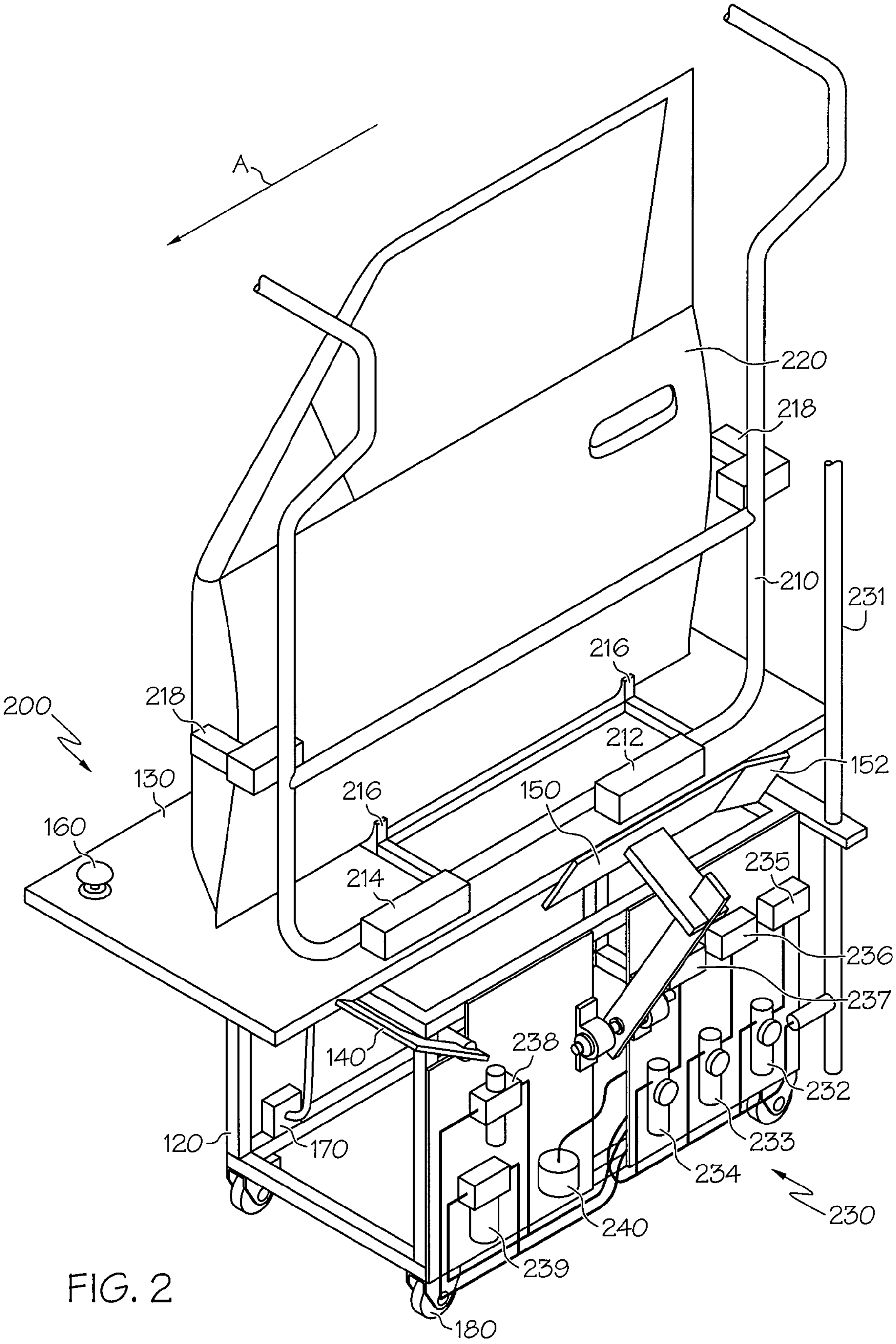
FIG. 2 is a perspective view of the exemplary automated dolly assembly according to FIG. 1, with the automated dolly assembly in an unengaged arrangement.
Figure 3:
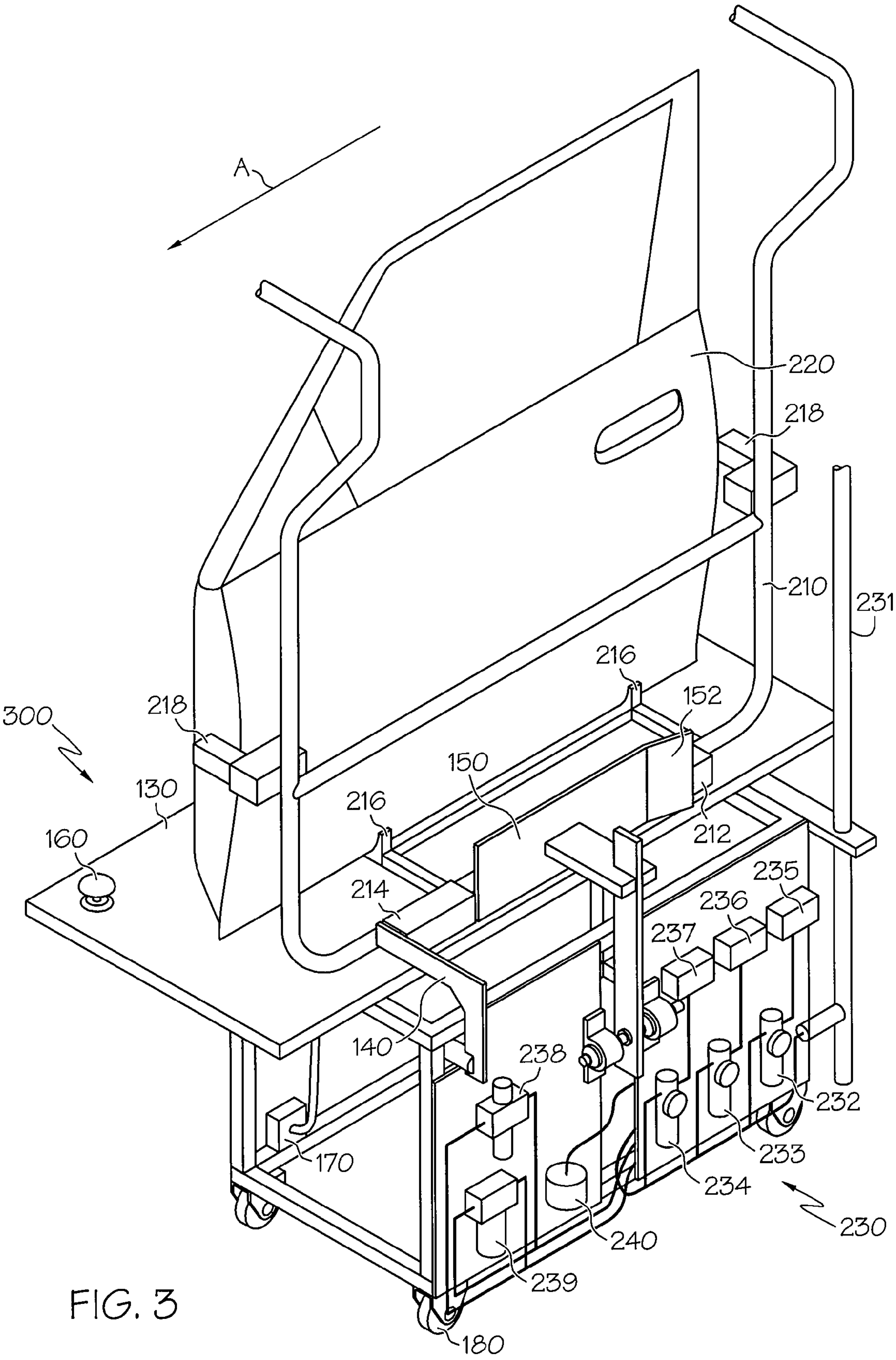
FIG. 3 is a perspective view of the exemplary automated dolly assembly according to FIG. 1, with the automated dolly assembly in a fully engaged arrangement.

Sync arm 140 may be capable of movement through connection with a firing mechanism 230. Referring to FIGS. 2 and 3, sync arm 140 may be capable of movement between a first position and a second position. FIG. 2 depicts automated dolly assembly 200 with sync arm 140 arranged in a first position, wherein sync arm 140 is free from contact with first contact area 214 of workpart carrier 210. FIG. 3 depicts automated dolly 300 with sync arm 140 arranged in a second position, wherein sync arm 140 contacts first contact area 214 of workpart carrier 210. The detailed process of utilizing firing mechanism 230 to move sync arm 140 from a first position to a second position will be described in further detail below.

Referring to FIGS. 1 and 2, support arm 150 may be any structure utilized to support workpart carrier 210 against rotational movement around a rail of an overhead conveyor system on which workpart carrier 210 is traveling. The illustrated embodiment includes support arm 150 that is constructed from a flat rectangular section of steel attached to an extension arm. Support arm 150 is shaped to contact second contact area 212 of workpart carrier 210. As shown in FIG. 3, a portion 152 of the flat rectangular section of support arm 150 may be angled in a direction away from second contact area 212 of workpart carrier 210. This angled portion 152 may alleviate damage to workpart carrier 210 and/or automated dolly assembly 100 in the event of a overhead conveyor system/automated dolly assembly 100 malfunction. In a situation where workpart carrier 210 and automated dolly assembly 100 are not able to sync their movements, angled portion 152 may allow the workpart carrier to wedge in front of support arm 150 and force the support arm backward, allowing the workpart carrier to travel past the automated dolly assembly. However, this angled portion 152 need not be included on support arm 150. Moreover, the particular shape and/or size dimensions of support arm 150 are not critical, as support arm 150 may be assembled in any suitable shape and/or size dimensions for a particular application, and may be constructed of any suitable materials known in the art.

Support arm 150 may be capable of movement through connection with firing mechanism 230. Referring to FIGS. 2 and 3, support arm 150 may be capable of movement between a first position and a second position. FIG. 2 depicts automated dolly assembly 200 with support arm 150 in a first position, wherein support arm 150 is free from contact with second contact area 212 of workpart carrier 210. FIG. 3 depicts automated dolly assembly 300 with support arm 150 in a second position, wherein support arm 150 contacts second contact area 212 of workpart carrier 210. The detailed process of utilizing firing mechanism 230 to move support arm 150 from a first position to a second position will be described in further detail below.

Referring to FIGS. 1-3, first switch 160 may be any switch disposed on body 110 that controls movement of support arm 150. In controlling movement of support arm 150, first switch 160 controls at least a portion of firing mechanism 230 (shown in FIGS. 2 and 3). The illustrated embodiment of automated dolly assembly 100 includes first switch 160 as a push-button switch disposed on the front right-hand corner of top surface 130. In such an embodiment, a worker may activate first switch 160 by pressing down on the switch with their hand or arm. Activating first switch 160 will control firing mechanism 230 to move support arm 150 from a first position (depicted in FIG. 2) to a second position (depicted in FIG. 3). Embodiments of automated dolly assembly 100 may include first switch 160 disposed at any location on body 110. Accordingly, the position of first switch 160 is not limited to the particular location shown in the illustrated embodiment, nor is it limited to locations on top surface 130. Alternate embodiments may include first switch 160 located at various locations on frame 120. First switch 160 also need not be a push-button switch, as any switch known in the art will suffice.

Some embodiments of automated dolly assembly 100 may further include second switch 170. Referring to FIG. 1, second switch 170 may be any switch disposed on body 110 that also functions to control movement of support arm 150. In controlling movement of support arm 150, second switch 170 may control the same portion of firing mechanism 230 that is controlled by first switch 160, and/or may control a different portion of firing mechanism 230. The illustrated embodiment of automated dolly assembly 100 includes second switch 170 as a push-button kick switch disposed on the front right-hand corner of frame 120. In such an embodiment, a worker may activate second switch 170 by kicking the switch with their foot or leg. Similar to first switch 160, activating second switch 170 will control firing mechanism 230 to move support arm 150 from a first position to a second position. Embodiments of automated dolly assembly 100 may include second switch 170 disposed at any location on body 110. Accordingly, the position of second switch 170 is not limited to the particular location shown in the illustrated embodiment, nor is it limited to locations on frame 120. Alternate embodiments may include second switch 170 located at positions on top surface 130 as well. Second switch 170 also need not be a kick switch, as any switch known in the art will suffice.

Referring to FIGS. 2 and 3, firing mechanism 230 may be any mechanism or system utilized to move sync arm 140 from a first position to a second position and vice versa, as well as move support arm 150 from a first position to a second position and vice versa. Firing mechanism 230 may also be utilized in the operation of other powered aspects of automated dolly assembly 100, such as powering a return motor. Firing mechanism 230 may utilize any structure and/or method useful in powering movement of sync arm 140 and support arm 150. Non-limiting examples include pneumatics, hydraulics, electric motors and the like.

The illustrated embodiment of automated dolly assembly 100 comprises a pneumatic firing mechanism 230 that includes three regulated air cylinders 232,233,234. A main air supply line 231 supplies air to the regulated air cylinders of firing mechanism 230. A first regulated air cylinder 232 may release pressurized air through a first valve 235 that may be controlled by an automated sync system (described in further detail below), the pressurized air powering an actuator (not shown) to move sync arm 140 from a first position to a second position. A second regulated air cylinder 233 may release pressurized air through a second valve 236 that may be controlled by first switch 160 and/or second switch 170, the pressurized air powering an actuator (not shown) to move support arm 150 from a first position to a second position. A third regulated air cylinder 234 may release pressurized air through a third valve 237 that may be controlled by an automated return system (described in further detail below), the pressurized air powering a return motor (not shown) to drive automated dolly assembly 100 back to its starting position on track 184. The illustrated embodiment of firing mechanism 230 may further include an emergency shutoff valve 238 to stop the flow of air powering automated dolly assembly 100. Embodiments of automated dolly assembly 100 with pneumatic firing mechanism 230 may include any number, style or type of valves and air cylinders. Embodiments of automated dolly assembly 100 also need not include pneumatic firing mechanism 230, as any structure and/or method useful in powering movement of sync arm 140 and support arm 150 may be applicable.

Some embodiments of automated dolly assembly 100 may further include a plurality of wheels 180 and/or a coaster system. The illustrated embodiment of automated dolly assembly 100 includes four wheels 180 attached on the perimeter of the bottom of frame 120 that ride within track 184 disposed on floor surface 182. That embodiment further includes a coaster system that comprises bearings (not shown) attached to the bottom of frame 120 of automated dolly assembly 100. The bearings may ride along the top and the bottom of a bar 186 disposed on or within floor surface 182, and may be adjustable to properly tension the coaster system. Bar 186 may further include grooves for the bearings to travel within. The floor surface may be elevated, so that panels of the floor surface may be removed to allow access for maintenance and adjustment of the bearings. The return motor described below may utilize this coaster system to drive automated dolly assembly 100 back to its starting position on track 184.

As depicted in FIGS. 2 and 3, both automated dolly assembly 200,300 and workpart carrier 210 may travel along an assembly line in the direction of axis A. Workpart carrier 210 rides along a rail of an overhead conveyor system (not shown), and thus travels along a predetermined path. Track 184 and bar 186 disposed on floor surface 182 mirror the path of the rail of the overhead conveyor system, and therefore automated dolly assembly 100 may follow the same predetermined path as workpart carrier 210 along the assembly line. However, embodiments of automated dolly assembly 100 need not include a plurality of wheels 180 and track 184, nor a coaster system, as movement of the automated dolly assembly may be achieved by any structure or method known in the art.

Some embodiments of automated dolly assembly 100 may further include a return motor. The illustrated embodiment of automated dolly system 100 includes a return motor attached to frame 120, although the return motor is hidden from view in the figures. The return motor may be any motor known in the art that can power automated dolly assembly 100 along track 184. Non-limiting examples of return motors include pneumatic motors, hydraulic motors, electric motors and the like. Further, the return motor may or may not utilize a coaster system. The illustrated embodiment of automated dolly assembly 100 includes a pneumatic return motor that utilizes a coaster system to propel the automated dolly assembly along track 184. That embodiment of automated dolly assembly 100 further depicts an oiler 239 and an oil filter 240 of maintenance of the return motor. The return motor uses compressed air to rotate the bearings attached to frame 120 (also riding along the top and bottom of bar 186), thus driving automated dolly assembly 100 on bar 186. Accordingly, with the cooperation of wheels 180, the return motor moves automated dolly assembly 100 along track 184.

Some embodiments of automated dolly assembly 100 may further include a release switch 190. As will be described in more detail below, workpart carrier 210 continually moves along a rail of an overhead conveyor system. When automated dolly assembly 100 is in a partially or fully engaged arrangement (both defined below) with workpart carrier 210, automated dolly assembly 100 continually moves with synced workpart carrier 210. Further, an automated return system may control the movement of sync arm 140 and/or support arm 150 from a second position to a first position (i.e., release automated dolly assembly 100 from workpart carrier 210) when automated dolly assembly 100 reaches a predetermined position on track 184. Automated return system may also control third valve 237 to power a return motor (not shown) to drive automated dolly assembly 100 back to its starting position along track 184. However, if the automated return system fails, or if a worker would like to release workpart carrier 210 from automated dolly assembly 100 before the automated dolly assembly reaches the predetermined position on track 184, a worker may activate release switch 190 to release automated dolly assembly 100 from workpart carrier 210 and control third valve 237 to power the return motor to drive the automated dolly assembly back to its starting position. Embodiments of automated dolly assembly 100 need not include release switch 190.

The following describes in detail the cooperation of automated dolly assembly 100 and workpart carrier 210. However, the following process only describes one application of the illustrated embodiment of automated dolly assembly 100. In such application, workpart carrier 210 travels along a rail of an overhead conveyor system and is utilized to carry vehicle doors 220 along an assembly line where workers may attach door trim pads. However, description of this particular application should not be construed as limiting automated dolly assembly 100 to such application. Accordingly, automated dolly assembly 100 has various additional assembly line applications that are not described herein, but recognized by a person skilled in the art.

In one particular application of the illustrated embodiment, workpart carrier 210 transmits vehicle doors 220 along an assembly line where workers may attach trim pads to the doors. Referring to FIGS. 2 and 3, workpart carrier 210 may secure vehicle door 220 through employment of side supports 218 and bottom supports 216 and travel along a rail of an overhead conveyor system (not shown). In traveling along the rail of the overhead conveyor system, workpart carrier 210 is not rigidly supported. Accordingly, workpart carrier 210, as well as vehicle door 220 attached to the workpart carrier, have a range of swing or rotational movement around the rail of the overhead conveyor system. Certain overhead conveyor system applications have a range of workpart carrier swing of approximately three to six inches as measured at the bottom of the workpart carrier. With reference to FIGS. 2 and 3, such swing can be described as a range of rotational movement around axis A. Without utilization of the automated dolly assembly, this range rotational movement makes it difficult for a worker to properly and efficiently attach a trim pad to door 220.

Workpart carrier 210 carrying door 220 continuously travels along the rail of the overhead conveyor system in the direction of axis A (i.e., workpart carrier 210 continuously progresses along the assembly line). When workpart carrier 210 enters a division of assembly line devoted to attaching a trim pad to door 220, workpart carrier 210 may be engaged with automated dolly assembly 100. Because automated dolly assembly 100 travels on floor surface 182 along track 184, and is connected to bar 186, workpart carrier 210 may be partially or fully restricted in rotational movement around the rail of the overhead conveyor system when engaged with automated dolly assembly 100.

Engagement of the automated dolly assembly and workpart carrier 210 may occur by the following process. Automated dolly assembly 100 is in a stationary starting position along track 184 as workpart carrier 210 approaches traveling along the rail of the overhead conveyor system. As automated dolly assembly 100 rests in it starting position, sync arm 140 is in a first position (therefore free from contact with first contact area 214 of workpart carrier 210) and support arm 150 is in a first position (therefore free from contact with second contact area 212 of workpart carrier 210). When sync arm 140 is in a first position and support arm 150 is in a first position, automated dolly assembly 100 is in an unengaged arrangement. When automated dolly assembly 100 is in this unengaged arrangement, the automated dolly assembly may move freely and independently of workpart carrier 210, and the range of workpart carrier swing around the rail of the overhead conveyor system is not restricted by the automated dolly assembly.

As workpart carrier 210 approaches automated dolly assembly 100, the height of the lowest part of the workpart carrier may be slightly higher than top surface 130 of the automated dolly assembly. Accordingly, there is clearance for workpart carrier 210 to travel over top of automated dolly assembly 100. As workpart carrier 210 travels to a predetermined position that is over the automated dolly assembly (as depicted in FIG. 2), an automated sync system may operate to sync the workpart carrier and the automated dolly assembly.

The automated sync system may utilize a spring-loaded limit switch (not shown) located on automated dolly assembly 100. Workpart carrier 210 may progress over top portion 130 of automated dolly assembly 100 until the workpart carrier reaches a predetermined position in relation to the automated dolly assembly. In this predetermined position, a portion of workpart carrier 210 contacts and trips the limit switch of the automated sync system. Once the limit switch is tripped, the automated sync system controls firing mechanism 230 to move sync arm 140 from a first position (as depicted in FIG. 2) to a second position (as depicted in FIG. 3). As described above, the activation of the automated sync system controls first valve 235 to release pressurized air from first regulated air cylinder 232 that powers an actuator to move sync arm 140. As illustrated in FIG. 3, sync arm 140 in second position contacts first contact area 214 of workpart carrier 210, thus syncing the movement of the automated dolly assembly and the workpart carrier. When sync arm 140 is in a second position (therefore contacting first contact area 214 of workpart carrier 210), but support arm is in a first position (therefore free from contacting second contact area 212 of workpart carrier 210), the automated dolly assembly is in a partially engaged arrangement. Therefore, as workpart carrier 210 continues to travel in the direction of axis A along the rail of the overhead conveyor system with automated dolly assembly 100 in a partially engaged arrangement, the automated dolly assembly is compelled to move with the workpart carrier. As detailed above, because track 184 and bar 186 mirror the path of the rail of the overhead conveyor system, automated dolly assembly 100 may smoothly move in this partially engaged arrangement along the assembly line with workpart carrier 210.

With automated dolly assembly 100 is in a partially engaged arrangement, a worker may activate push-button switch 160 or kick switch 170 to control firing mechanism 230 to move support arm 150 from a first position (as depicted in FIG. 2) to a second position (as depicted in FIG. 3). As described above, the activation of first switch 160 or kick switch 170 controls second valve 236 to release pressurized air from second regulated air cylinder 233 that powers an actuator to move support arm 150. As illustrated in FIG. 3, support arm 150 in a second position contacts second contact area 212 of workpart carrier 210, thus supporting the workpart carrier and at least partially restricting it from its prior range of swinging movement (i.e., rotational movement around the rail of the overhead conveyor system). When sync arm 140 is in a second position (therefore contacting first contact area 214 of workpart carrier 210), and support arm is in a second position (therefore contacting second contact area 212 of workpart carrier 210), automated dolly assembly 100 is in a fully engaged arrangement. When automated dolly assembly 100 is in this fully engaged arrangement, the range of workpart carrier swing is restricted or eliminated and a worker is able to more easily and effectively attach a trim pad to door 220 attached to workpart carrier 100.

During and after a worker attaches a trim pad to door 200 (or, in other applications, performs a different manufacturing operation on a workpart), workpart carrier 210 and automated dolly assembly 100 may continue to travel together in a fully engaged arrangement along the assembly line. As automated dolly assembly 100 travels with workpart carrier 210 and reaches a predetermined position along track 184, an automated return system may operate to move sync arm 140 from a second position to a first position and support arm 150 from a second position to a first position (i.e., return the automated dolly assembly to an unengaged arrangement), as well as return the automated dolly assembly to its starting position on track 184.

The automated return system may utilize a spring-loaded limit switch (not shown) located on automated dolly assembly 100. Automated dolly assembly 100 may progress along track 184 until it reaches a predetermined position along track 184, at which point the limit switch of the automated sync system contacts a limit switch tripping structure (not shown) on floor surface 182. Once the limit switch is tripped, the automated return system controls firing mechanism 230 to move sync arm 140 from a second position (as depicted in FIG. 3) to a first position (as depicted in FIG. 2), and support arm 150 from a second position (as depicted in FIG. 3) to a first position (as depicted in FIG. 2). This may be accomplished by firing mechanism 230 releasing the pressurized air in the actuators. With sync arm 140 is in a first position (therefore free from contact with first contact area 214 of workpart carrier 210), and support arm is in a first position (therefore free from contact with second contact area 212 of workpart carrier 210), automated dolly assembly 100 is again in an unengaged arrangement. Therefore, automated dolly assembly 100 may again move freely and independently of workpart carrier 210.

The tripping of the spring-loaded limit switch of the automated return system may also control a return motor to drive automated dolly assembly 100 back to its starting position along track 184. As described above, the activation of automated return system controls third valve 237 to release pressurized air from third regulated air cylinder 234 that powers the return motor. The return motor cooperates with the coaster system and utilizes pressurized air to move automated dolly assembly 100 back to its starting position along track 184. As previously described, a worker may also activate release switch 190 to function in the same way as the tripped spring-loaded limit switch of automated return system. Once automated dolly assembly 100 is returned to its stationary starting position, the process may repeat.

The foregoing description of various embodiments of the invention has been presented for the purposes of illustration and description. It is not intended to be exhaustive or to limit the invention to the precise form disclosed. Many alternatives, modifications and variations will be apparent to those skilled in the art of the above teaching. While some of the diverse embodiments of the automated dolly assembly have been discussed specifically, other embodiments will be apparent or relatively easily developed by those of ordinary skill in the art. Accordingly, this invention is intended to embrace all alternatives, modifications and variations that have been discussed herein, and others that fall within the spirit and broad scope of the claims.

What is claimed is:

1. An automated dolly assembly comprising:

a body comprising a frame with wheels proximate to a bottom surface and a top surface, wherein the top surface has a longitudinal direction in a direction of automated dolly assembly travel;

a sync arm connected to the body wherein the sync arm is movable into an orientation orthogonal to the longitudinal direction of the top surface;

a support arm connected to the body wherein the support arm is movable into an orientation parallel to the longitudinal direction of the top surface;

a first switch disposed on the body to control movement of the support arm; and a firing mechanism comprising a first regulated air cylinder and a first valve for moving the sync arm and a second regulated air cylinder and a second valve operating independently of the first valve for moving the support arm.

2. The automated dolly assembly of claim 1, further comprising a second switch disposed on the body to control movement of the support arm.

3. The automated dolly assembly of claim 2, wherein the first switch is a push-button switch disposed on the top surface and the second switch is a kick switch disposed on the frame.

4. The automated dolly assembly of claim 1, wherein the first switch controls a firing mechanism that moves the support arm from a first position to a second position.

5. The automated dolly assembly of claim 4, wherein the firing mechanism is pneumatic.

6. The automated dolly assembly of claim 4, wherein when the support arm is in a first position, the support arm is free from contact with a workpart carrier traveling along a rail of an overhead conveyor, and when the support arm in is a second position, the support arm contacts the workpart carrier.

7. The automated dolly assembly of claim 6, wherein when the support arm is in a second position, the automated dolly assembly is in a fully engaged arrangement, and when the support arm is in a first position, the automated dolly assembly is in a partially engaged arrangement or unengaged arrangement.

8. The automated dolly assembly of claim 7, wherein when the automated dolly assembly is in a fully engaged arrangement, the workpart carrier is restricted in at least a portion of rotational movement around the rail of the overhead conveyor system.

9. The automated dolly assembly of claim 8, wherein the workpart carrier is carrying a vehicle door.

10. An automated dolly assembly comprising:

a body comprising a frame with wheels proximate to a bottom surface and a top surface, wherein the to surface has a longitudinal direction in a direction of automated dolly assembly travel;

a sync arm connected to the body, wherein the sync arm is movable from a first position to a second position orthogonal to the longitudinal direction of the to surface;

a support arm connected to the body, wherein the support arm is movable from a first position to a second position parallel to the longitudinal direction of the to surface;

at least one switch disposed on the body to control movement of the support arm; and a firing mechanism comprising a first regulated air cylinder and a first valve for moving the sync arm and a second regulated air cylinder and a second valve operating independently of the first valve for moving the support arm, wherein when a workpart carrier traveling along an overhead conveyor system reaches a predetermined position in relation to the automated dolly assembly, an automated sync system controls the first valve to move the sync arm from the first position to the second position;

wherein when the at least one switch is activated to control the second valve, the support arm moves from the first position to the second position.

11. The automated dolly assembly of claim 10, wherein when the sync arm is in the second position and the support arm is in the first position, the automated dolly assembly is in a partially engaged arrangement, and when the sync arm is in the second position and the support arm is in the second position, the automated dolly is in a fully engaged arrangement.

12. The automated dolly assembly of claim 11, wherein when the automated dolly is in a partially engaged arrangement, movement of the automated dolly is synced with movement of the workpart carrier along the rail of an overhead conveyor system, and when the automated dolly assembly is in a fully engaged arrangement, movement of the automated dolly assembly is synced with movement of the workpart carrier along the overhead conveyor system and the workpart carrier is restricted in at least a portion of rotational movement around a rail of the overhead conveyor system.

13. An automated dolly assembly comprising:

a body comprising a frame with wheels proximate to a bottom surface and a top surface, wherein the top surface has a longitudinal direction in a direction of automated dolly assembly travel;

a sync arm connected to the body;

a support arm connected to the body;

at least one switch disposed on the body to control movement of the support arm; and a firing mechanism comprising a first regulated air cylinder and a first valve for moving the sync arm and a second regulated air cylinder and a second valve operating independently of the first valve for moving the support arm, wherein the sync arm is capable of movement between a first position and a second position orthogonal to the longitudinal direction of the top surface, wherein when the sync arm is in the first position, the sync arm is free from contact with a portion of a workpart carrier traveling along a rail of an overhead conveyor, and when the sync arm is in the second position, the sync arm contacts a portion of the workpart carrier; and wherein the support arm is capable of movement between a first position and a second position parallel to the longitudinal direction of the top surface, wherein when the support arm is in the first position, the support arm is free from contact with a portion of the workpart carrier, and when the support arm is in the second position, the support arm contacts a portion of the workpart carrier.

14. The automated dolly assembly of claim 13, wherein the firing mechanism is pneumatic.

15. The automated dolly assembly of claim 13, wherein when the workpart carrier is in a predetermined position relative to the automated dolly assembly, a automated sync system controls the firing mechanism to move the sync arm from the first position to the second position.

16. The automated dolly assembly of claim 15, wherein when a user activates the at least one switch, the firing mechanism moves the support arm from the first position to the second position.

17. The automated dolly assembly of claim 16, wherein when the automated dolly assembly is in a predetermined position along a track, a automated return system controls the firing mechanism to move the sync arm from the second position to the first position and moves the support arm from the second position to the first position.

18. The automated dolly assembly of claim 16, wherein when the sync arm is in the second position and the support arm is in the first position, the automated dolly assembly is in a partially engaged arrangement, and when the sync arm is in the second position and the support arm is in the second position, the automated dolly is in a fully engaged arrangement.

19. The automated dolly assembly of claim 18, wherein when the automated dolly assembly is in a fully engaged position, the workpart carrier is restricted in at least a portion of rotational movement around the rail of the overhead conveyor system.

* * * * *